US006356201B1

United States Patent
Alles (10) Patent No.: US 6,356,201 B1
(45) Date of Patent: Mar. 12, 2002

(54) SYSTEM AND METHOD FOR MONITORING A COVER LAYER OF A COMPOSITE STRUCTURE WHEREIN THE COVER LAYER IS SUBJECTED TO WEAR

(75) Inventor: Rainer Alles, Isernhagen (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 09/389,369

(22) Filed: Sep. 3, 1999

(30) Foreign Application Priority Data

Sep. 3, 1998 (DE) ......................................... 198 40 081

(51) Int. Cl.⁷ ............................................... G08B 21/00
(52) U.S. Cl. .................... 340/679; 340/572.1; 340/679; 340/988; 342/51; 342/42
(58) Field of Search .................... 342/42, 51; 340/572, 340/988, 679

(56) References Cited

U.S. PATENT DOCUMENTS 5,557,279 A * 9/1996 D'Hont ...................... 342/42

FOREIGN PATENT DOCUMENTS

| DE | 4444264 | 4/1996 |
| DE | 195 25 326 | 10/1996 |

* cited by examiner

*Primary Examiner*—Daryl Pope
(74) *Attorney, Agent, or Firm*—Walter Ottesen (57) ABSTRACT

The invention relates to a system for monitoring a layer (8), which is subjected to wear, of a composite structure (2) and relates especially to a system for monitoring the cover layer (8) of a conveyor belt (2). The monitoring system includes a transmitter/receiver device (4) which continuously generates an electromagnetic field. A ferromagnetic layer (16) of high permeability is embedded in the cover layer (8) and shields a transponder (6), which is embedded in the conveyor belt (2), from the electromagnetic field as long as it is not damaged by wear. The transmitter/receiver device (4) recognizes the wear of the cover layer (8) in that it receives data from the transponder (6) because, in this case, the ferromagnetic layer (16) is damaged over a large area. The invention also relates to a method for monitoring a composite structure (2) having a layer (8) subjected to wear. The invention relates especially to a method for monitoring the cover layer (8) of a conveyor belt (2).

14 Claims, 5 Drawing Sheets

SYSTEM AND METHOD FOR MONITORING A COVER LAYER OF A COMPOSITE STRUCTURE WHEREIN THE COVER LAYER IS SUBJECTED TO WEAR

FIELD OF THE INVENTION

The invention relates to a system for monitoring the cover layer of a composite structure wherein the cover layer is subjected to wear. The element can, for example, be a cover layer of a conveyor belt and the system for monitoring this cover layer can include a transponder embedded in the body of the composite structure, a spatially fixed transmitter/receiver device mounted external to the composite structure with the transmitter/receiver device continuously generating an electromagnetic field; and, the transponder is supplied with energy in a receiving region of the transmitter/receiver device by the electromagnetic field and transmits data to the transmitter/receiver device when it is supplied with the energy.

The invention also relates to a method for monitoring a layer of a composite structure wherein the layer is subjected to wear. The method can be especially for monitoring the cover layer of a conveyor belt.

BACKGROUND OF THE INVENTION

The monitoring of the cover layer of a conveyor belt is especially significant because too intense a wear of the cover layer of the conveyor belt can lead to damage of the latter and, in the extreme case, even to a tearing of the conveyor belt. This can have very expensive consequences and can cause delays in production. A reliable detection of the state of wear of the cover layer of a conveyor belt can contribute to a timely repair or replacement of the conveyor belt and to avoiding subsequent damage or production delays. Systems are already known from the state of the art which are directed to the reliable detection of the state of wear of the cover layer of a conveyor belt.

German patent publication 4,444,264 discloses a system for monitoring the cover layer of a conveyor belt of the kind referred to above. Each transponder, which is embedded in the conveyor belt coacts with a conductor loop. The conductor loops are embedded in the cover layer of the conveyor belt and the ends of the loops are directed upwardly in such a manner that the tips thereof are located at different distances from the surface of the cover layer. The transponder corresponding to a particular conductor loop is supplied with energy when the transponder is in the receiving region of the external spatially fixed transmitter/receiver device. The transponder transmits an individual identifier to the transmitter/receiver device. If there is wear of the cover layer of the conveyor belt, then the tip of the conductor loop is cut through depending upon the extent of the wear so that the transponder, which is assigned to this conductor loop, can no longer be supplied by the transmitter/receiver device with energy in the receiving region. In this case, the transmitter/receiver device receives no individual identifier from the transponder and this is an indication for the device that a specific wear is present at a specific location of the layer of the conveyor belt. The transmitter/receiver device can then initiate corresponding measures.

The system disclosed in German patent publication 4,444,264 is only suitable to a limited extent for monitoring the cover layer of a conveyor belt because the conductor loops, which are embedded in the cover layer, have a high mechanical sensitivity and therefore can be destroyed not only by wear of the cover layer but also for other reasons such as material fatigue.

German patent publication 195 25 326 likewise discloses a system for monitoring the cover layer of a conveyor belt of the kind referred to above. Several transponders are embedded in the cover layer of the conveyor belt at different spacings to the surface. The transponders transmit an individual identifier to an external transmitter/receiver device at a fixed location when the transponders come into the receiving region of this transmitter/receiver device. The transponders can become inoperative as a consequence of the wear of the cover layer of the conveyor belt in dependence upon the extent of the wear so that, for a continuing wear, ever fewer transponders transmit their individual identifier to the transmitter/receiver device. The transmitter/receiver device can determine the wear of the cover layer based on the non-transmittal of the individual identifier and, if needed, initiate appropriate measures.

The system disclosed in German patent publication 195 25 326 is suitable for monitoring the cover layer of a conveyor belt only to a limited extent because the transponders, which are embedded in the cover layer, can be prematurely destroyed not only because of the wear of the cover layer but also for other reasons such as the impact of individual pieces of goods to be conveyed. This case can especially occur when coarse material is conveyed and the transponder is located directly in the area of the belt which is subjected to the load. An indication of the wear is triggered in the transmitter/receiver device by a premature destruction of the transponder even though the cover layer of the conveyor belt is still present in its complete thickness.

SUMMARY OF THE INVENTION

It is an object of the invention to provide a system for monitoring a layer of a composite structure wherein the layer is subjected to wear. It is also an object of the invention to provide a system for monitoring the cover layer of a conveyor belt with which a reliable monitoring of wear of the layer subjected to wear is possible and wherein erroneous indications are avoided to the greatest extent possible. It is a further object of the invention to provide a method for monitoring a layer of a composite structure wherein the layer is subjected to wear. It is especially an object of the invention to provide a method for monitoring the cover layer of a conveyor belt wherein a reliable monitoring of wear is possible without erroneous indications.

The system of the invention is for monitoring a cover layer of a composite structure for wear with the cover layer having an outer surface and being subject to the wear during operation of the composite structure. The system includes: a transponder embedded in the composite structure; a transmitter/receiver device for continuously generating an electromagnetic field and the transmitter/receiver device being arranged spatially fixed outside of the composite structure; the transponder being disposed in a receiving region of the transmitter/receiver device so that the transponder can be supplied with energy by the electromagnetic field and can transmit data to the transmitter/receiver device when the transponder is supplied with energy; a ferromagnetic layer having a high permeability and being embedded in the cover layer between the transponder and the outer surface of the cover layer; and, the ferromagnetic layer being disposed to shield the transponder in the receiving region of the transmitter/receiver device so that the transmitter/receiver device receives no data from the transponder.

According to a feature of the method of the invention, a continuous check is made in the transmitter/receiver device as to whether data from a transponder are received with the transponder being embedded in the body of the composite structure. It is a feature of the method of the invention that measures are initiated by the transmitter/receiver device when data are received.

The basic idea of the invention is that the transponder is mounted in or at the body of the composite structure outside of the zone of wear of the cover layer. An announcement of the wear takes place when the ferromagnetic layer, which is assigned to the transponder, is destroyed over a large area by wear so that it loses its shielding effect.

The advantages achieved with the invention are especially that the wear of the cover layer can be reliably monitored without erroneous indications occurring because the ferromagnetic layer retains its shielding effect even when it is damaged slightly (for example, with a tear) and because the transponder is mounted below the ferromagnetic layer so that it is protected against the conventional mechanical loads of the body of the composite structure. For example, the impact load on the cover layer of the conveyor belt could be caused by a coarse object to be conveyed. A further advantage of the invention is that only the ferromagnetic layer of high permeability is destroyed with the wear of the cover layer because the transponder is mounted below this layer. This layer can be replaced easily and without great expense with a repair of the composite structure. The transponders, which are embedded in the body, are not destroyed with the wear of the cover layer.

According to another feature of the invention, the transmitter/receiver device is so mounted relative to the cover layer that the ferromagnetic layer of high permeability lies in the receiving region of the transmitter/receiver device between the transponder and the transmitter/receiver device.

According to another embodiment of the invention, the transmitter/receiver device is so mounted relative to the cover layer that the transponder lies in the receiving region of the transmitter/receiver device between the ferromagnetic layer and the transmitter/receiver device. In this embodiment, the transponder must be mounted directly next to the ferromagnetic layer of high permeability. It has been shown that, in this case, the transponder cannot be read out in the receiving region of the transmitter/receiver device even though it is located between the transmitter/receiver device and the ferromagnetic layer of high permeability.

According to another feature of the invention, the ferromagnetic layer of high permeability is substantially parallel to the surface of the layer subjected to wear. The advantage of this embodiment is that the entire ferromagnetic layer is located at a defined distance to the surface of the layer subjected to wear so that a defined wear is indicated when the ferromagnetic layer is destroyed over a large area by wear.

According to another feature of the invention, the ferromagnetic layer of high permeability is made of a metal foil. According to another embodiment, the ferromagnetic layer of high permeability comprises a wire lattice.

According to still another feature of the invention, the ferromagnetic layer of high permeability has a thickness of 0.1 mm to 2 mm. The advantage of this embodiment is that the ferromagnetic layer can also be embedded in an extremely thin wear layer and the wear of this layer can be reliably monitored. A further advantage of this embodiment is that a thin ferromagnetic layer of this kind is immediately destroyed when it is exposed by the wear of the layer subjected to wear. In this way, the critical wear is indicated directly.

According to another feature of the invention, the composite structure of the invention can include several layers and the transponder is mounted outside of the layer subjected to wear. The basic idea of this further embodiment is that the wear layer of the composite structure is subjected also to other mechanical loads to an especially great extent. Accordingly, the cover layer of the conveyor belt is, for example, subjected to conveyed goods so that it is there subjected to high mechanical loads. The transponder can be protected against these high mechanical loads either in that it is embedded as deep as possible in the cover layer or that it is embedded in another layer outside of the cover layer. The advantage of this embodiment of the invention is that the transponder embedded in the composite structure is protected especially well from the usual mechanical loads to which the composite structure is subjected.

According to still another embodiment of the invention, the transponder is operatively connected to a conductor loop, which is electrically conductive and is embedded in the composite structure below the ferromagnetic layer of high permeability. The advantage of this embodiment is that the transponder can be positioned at any desired location in the composite structure insofar as it can be supplied with energy via the conductor loop at this location. Preferably, the transponder is mounted at a location which is subjected to an especially low mechanical load of the unit in daily use. Preferably, the conductor loop is mounted outside of the layer subjected to wear for a composite structure comprising several layers. In this case, the conductor loop is protected especially well against the mechanical loads which operate on the composite structure during normal use.

According to still another embodiment of the invention, several ferromagnetic layers of high permeability are embedded in a cover layer subjected to wear. These ferromagnetic layers are located at different layer depths and each layer is assigned to at least one transponder. The advantage of this embodiment is that different degrees of wear of the layer subjected to wear of the composite structure can be monitored. The transmitter/receiver device can first output a warning for a slight wear; however, the device can prevent a further use of the composite structure when there is advanced wear.

According to another embodiment of the invention, each of the transponders embedded in the composite structure transmits an individual identifier to the transmitter/receiver device when it is supplied with energy by the device. The advantage of this embodiment is that the position of the transponder is detected based on the individual identifier from the transmitter/receiver device and, therefore, the position of the wear is detected when the device receives the individual identifier of the transponder.

BRIEF DESCRIPTION OF THE DRAWINGS

The invention will now be described with reference to the drawings wherein:

FIG. 2b is a cross section through the conveyor belt along line IIb—IIb of FIG. 2a;

FIG. 3b is a cross section taken through the conveyor belt along line IIIb—IIIb of FIG. 3a;

DESCRIPTION OF THE PREFERRED EMBODIMENTS OF THE INVENTION

Figure 1:
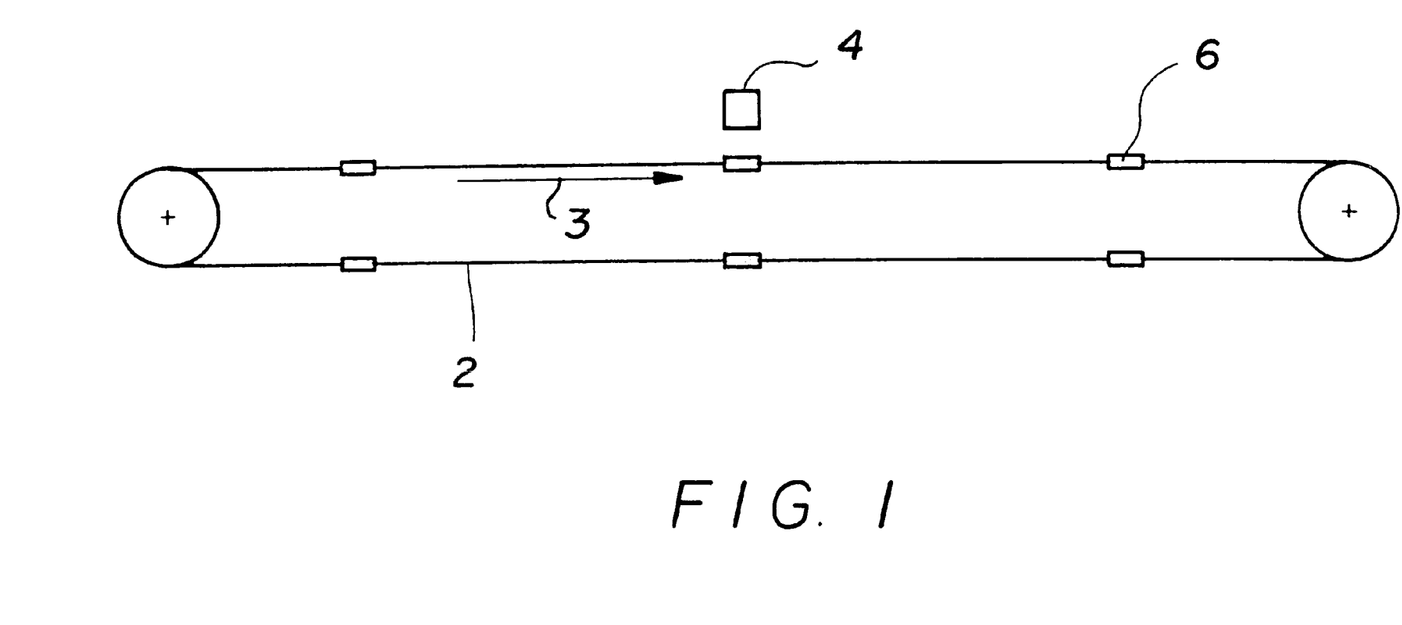
FIG. 1 is a schematic of a system for monitoring a conveyor belt.

FIG. 1 is a schematic representation of a system for monitoring a composite structure in the form of a continuous conveyor belt 2 wherein the direction of movement of the conveyor belt is indicated by the arrow 3. An external spatially fixed transmitter/receiver device 4 is mounted externally of the conveyor belt 2 and continuously generates an electromagnetic field. Transponders 6 are embedded in the conveyor belt at uniform spacings. The transponders 6 are each shielded by a ferromagnetic layer of high permeability (not shown in FIG. 1). As long as the ferromagnetic layer is not destroyed by wear over a large area or is removed from the cover layer, the transmitter/receiver device 4 can read out no data from the transponder 6 even when a transponder 6 comes into the receiving region of the transmitter/receiver device 4. The term "receiving region" is understood to mean that a transponder 6 in this region can be supplied with energy by the transmitter/receiver device 4 and could be read out if it were not shielded by the ferromagnetic layer of high permeability.

In contrast to the above, the transmitter/receiver device 4 can supply the transponder 6 in the receiving region with energy and can read data therefrom when the ferromagnetic layer, which is assigned to the transponder, has been destroyed over a large area by wear of the cover layer or the ferromagnetic layer has been removed from the cover layer. In this case, measures can be initiated by the transmitter/receiver device 4 which, for example, can be in the form of an announcement of the wear or a stopping of the conveyor belt 2.

Figure 2A:
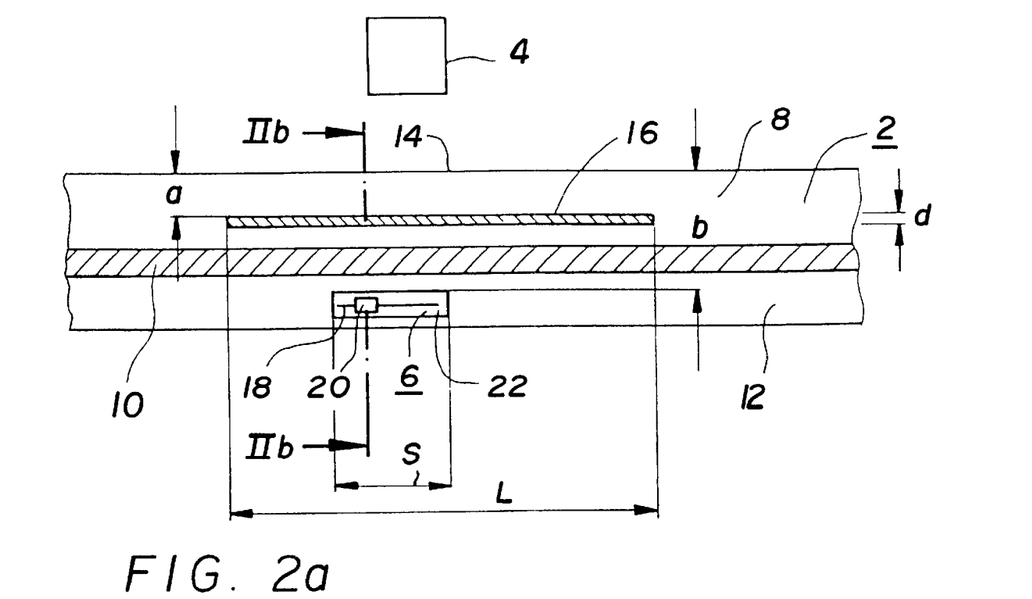
FIG. 2a is a detail longitudinal section view of the system for monitoring a conveyor belt.

FIG. 2a shows a detail view, in longitudinal section, from the system for monitoring a conveyor belt 2 having a transmitter/receiver device 4. The conveyor belt 2 includes a cover layer 8 which is separated from the running layer 12 by a tension support 10 in the form of steel cords or in the form of a carrier mesh. The surface 14 of the cover layer 8, which is directed outwardly, is loaded during operation of the conveyor belt 2 by material or goods to be conveyed so that the cover layer 8 is subjected to wear. During continuous movement of the conveyor belt 2, the running layer 12 is guided over the drums 5 shown in FIG. 1 and is not impacted by the materials or goods conveyed.

A ferromagnetic layer 16 of high permeability is embedded in the cover layer 8 at a spacing (a) from the surface 14 of the cover layer 8. The ferromagnetic layer 16 runs substantially parallel to the surface 14 of the cover layer 8. The ferromagnetic layer 16 is preferably formed as a metal layer or a wire lattice and preferably has a thickness (d) of 0.1 mm to 2 mm.

A transponder 6 is embedded in the running layer 12 below the ferromagnetic layer 16 (as seen from the surface 14) at a distance (b) from the surface 14 of the cover layer 8. The ferromagnetic layer 16 therefore lies between the transponder 6 and the surface 14. The transponder 6 comprises an integrated circuit 20 connected to an electrically-conductive coil 18 and is so aligned in the running layer 12 that the region, which is included by the coil 18, is substantially parallel to the surface of the running layer 12 and/or the cover layer 8. Typically, the coil of the transponder includes approximately the area of a commercially-available credit card. Furthermore, the transponder 6 is preferably embedded in a body 22 for protection against mechanical loads.

Figure 2B:
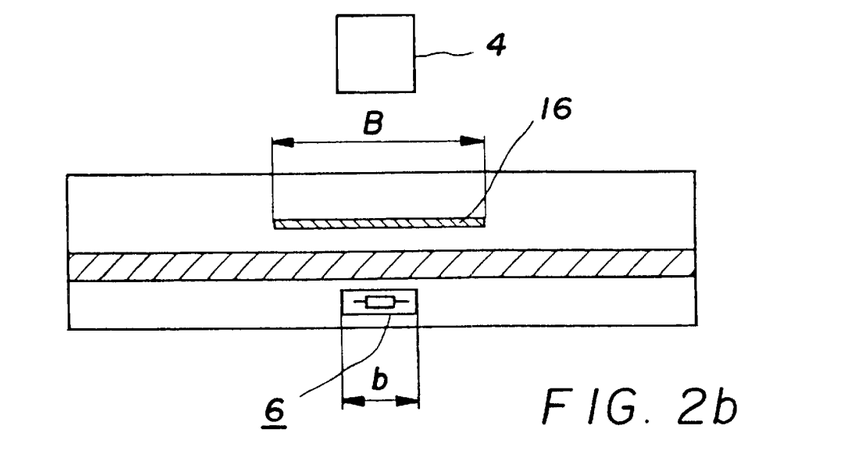

The longitudinal expansion L of the ferromagnetic layer 16 is at least as great as the longitudinal expansion of the transponder 6. The width expansion B of the ferromagnetic layer 16 is likewise at least as great as the width expansion (b) of the transponder 6. In this connection, reference can be made to FIG. 2b which shows a cross section along line IIb—IIb of FIG. 2a. Preferably, the longitudinal expansion L of the ferromagnetic layer 16 is from one to twenty times as great as the longitudinal expansion (s) of the transponder 6. The width expansion B of the ferromagnetic layer 16 is likewise from one to twenty times as great as the width expansion (b) of the transponder 6. For corresponding dimensions, it has been shown that a good shielding of the transponder 6 relative to the transmitter/receiver device 4 is ensured.

The transmitter/receiver device 4 is mounted above the cover layer 8 so that the ferromagnetic layer 16 lies between the transmitter/receiver device 4 and the transponder 6 when the transponder 6 is located in the receiving area of the transmitter/receiver device 4. The transmitter/receiver device 4 continuously generates an electromagnetic field. The ferromagnetic layer 16 shields the transponder 6 from the generated electromagnetic field as long as the ferromagnetic layer 16 is undamaged or is only slightly damaged, for example, in the form of a tear. The ferromagnetic layer 16 even shields the transponder 6 when the transponder 6 is located in the receiving area of the transmitter/receiver device 4. The transponder 6 is not supplied with energy and no data can be read out therefrom.

The ferromagnetic layer 16 loses its shielding effect when it is damaged over a large area by wear of the cover layer 8 or if the layer 16 is torn out of the cover layer 8. The transponder 6 is then supplied with energy in the receiving area of the transmitter/receiver device 4 and, in turn, outputs a signal, which has an identifier individual to the transponder, in the reverse direction toward the transmitter/receiver device 4. The reception of the signal is an indication for the transmitter/receiver device 4 that the ferromagnetic layer 16 has been damaged over a large area by wear of the cover layer 8 and/or has been torn out of the cover layer and that the cover layer 8 has been worn in the region of the transponder 6 up to the depth (a) at which the ferromagnetic layer 16 had been lying. The transmitter/receiver device 4 can then initiate corresponding measures which, for example, either constitute a warning or result in a stop of the conveyor belt.

Figure 3A:
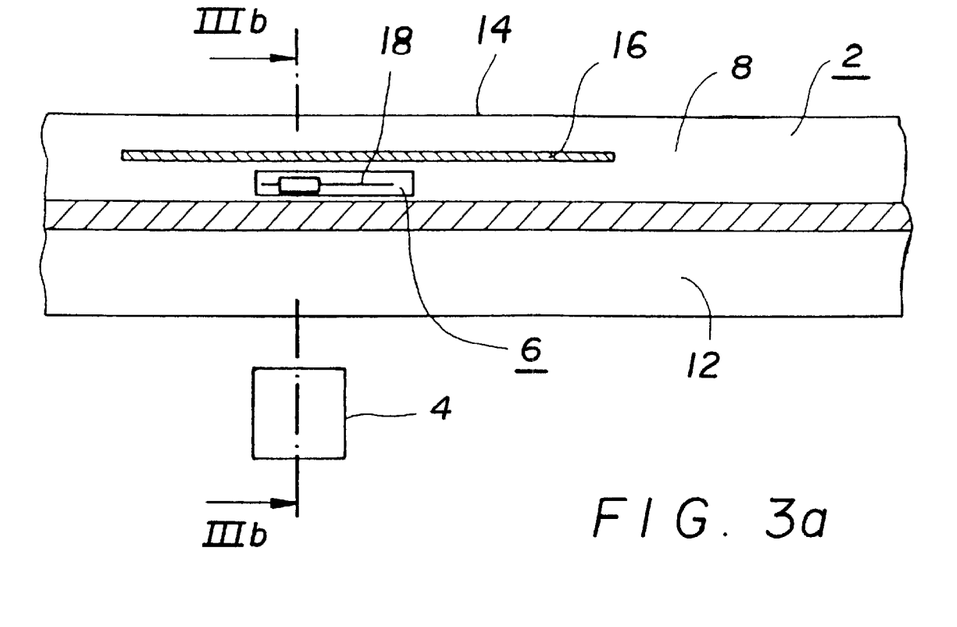
FIG. 3a is a detailed longitudinal section of a system for monitoring a conveyor belt according to an embodiment of the invention.
Figure 3B:
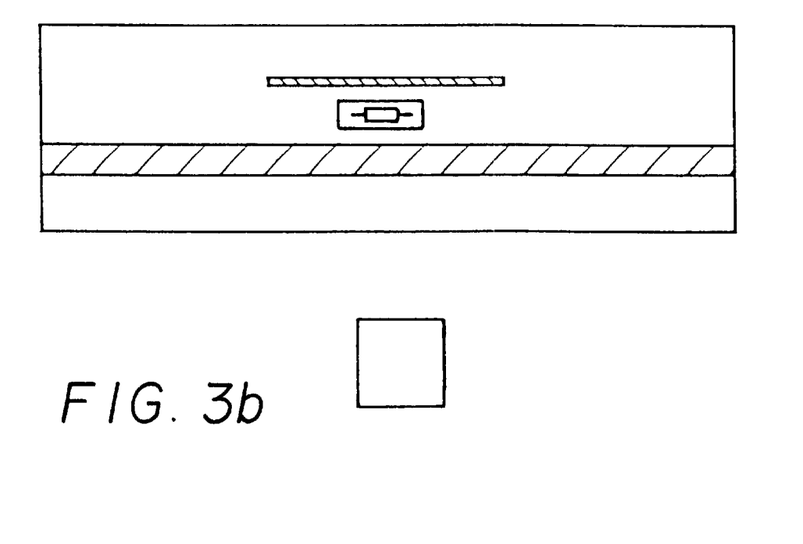

FIG. 3a shows a detail view, in longitudinal section, of a system for monitoring the cover layer 8 of a conveyor belt 2. A ferromagnetic layer 16 is embedded in the cover layer 8 as already explained with reference to FIG. 2. A transponder 6 is embedded directly below the ferromagnetic layer 16 as viewed from the surface 14 of the cover layer 8. Reference can be made to the description associated with FIGS. 2a and 2b with respect to: the assembly of the transponder 6, the alignment of the transponder 6 in the cover layer 8 and the size ratios of the ferromagnetic layer 16 to the transponder 6. The spacing between the ferromagnetic layer 16 and the transponder 6 is only a few millimeters, preferably, 1 to 5 mm.

A transmitter/receiver device 4 is mounted below the running layer 12 of the conveyor belt 2 so that the transponder 6 lies in the receiving area of the transmitter/receiver device 4, that is, between the transmitter/receiver device 4 and the ferromagnetic layer 16. The transmitter/receiver device 4 continuously generates an electromagnetic field. It has been shown that no data can be read out from the transponder 6 as long as the ferromagnetic layer 16 is not damaged or only slightly damaged. This is so because the field lines of the electromagnetic field are so deflected by the ferromagnetic layer 16 that the voltage, which is induced in the coil 18 of the transponder 6, is not sufficient in order to supply the transponder 6 with energy.

The ferromagnetic layer 16 loses its shielding effect only when it is damaged over a large area by wear of the cover layer 8 or is torn out of the cover layer. In this case, the transponder 6 is supplied with energy by the transmitter/receiver device 4 and data can be read out of the transponder. The transmitter/receiver device 4 can then initiate measures as already explained with reference to FIGS. 2a and 2b. It has been shown that the transponder 6 remains undamaged even in this embodiment when the ferromagnetic layer 16 is damaged even though the transponder is mounted directly next to the ferromagnetic layer 16. This is so because the monitoring system operates with such a high precision that sufficient time remains to stop the conveyor belt after damage to the ferromagnetic layer 16 and to repair the same before the transponder 6 is damaged.

Figure 4A:
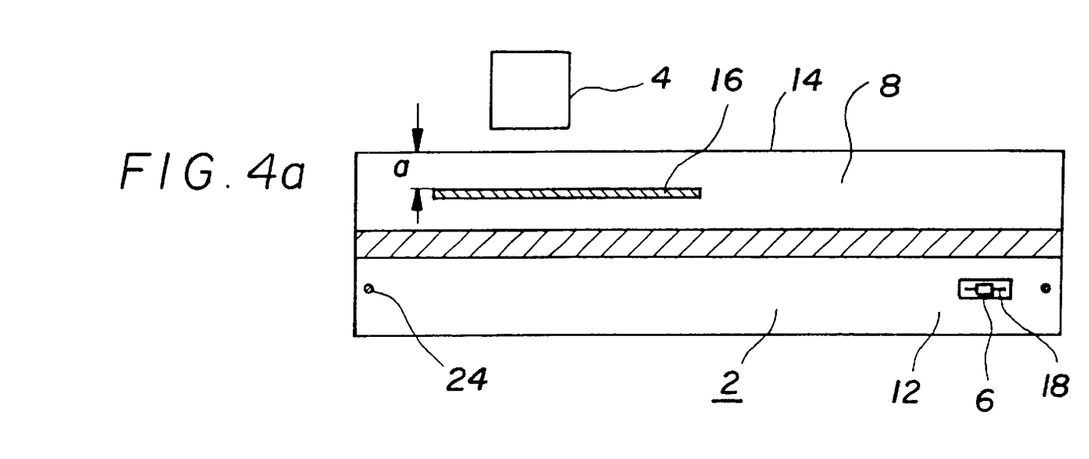
FIG. 4a is a perspective detail view from a conveyor belt.
Figure 4B:
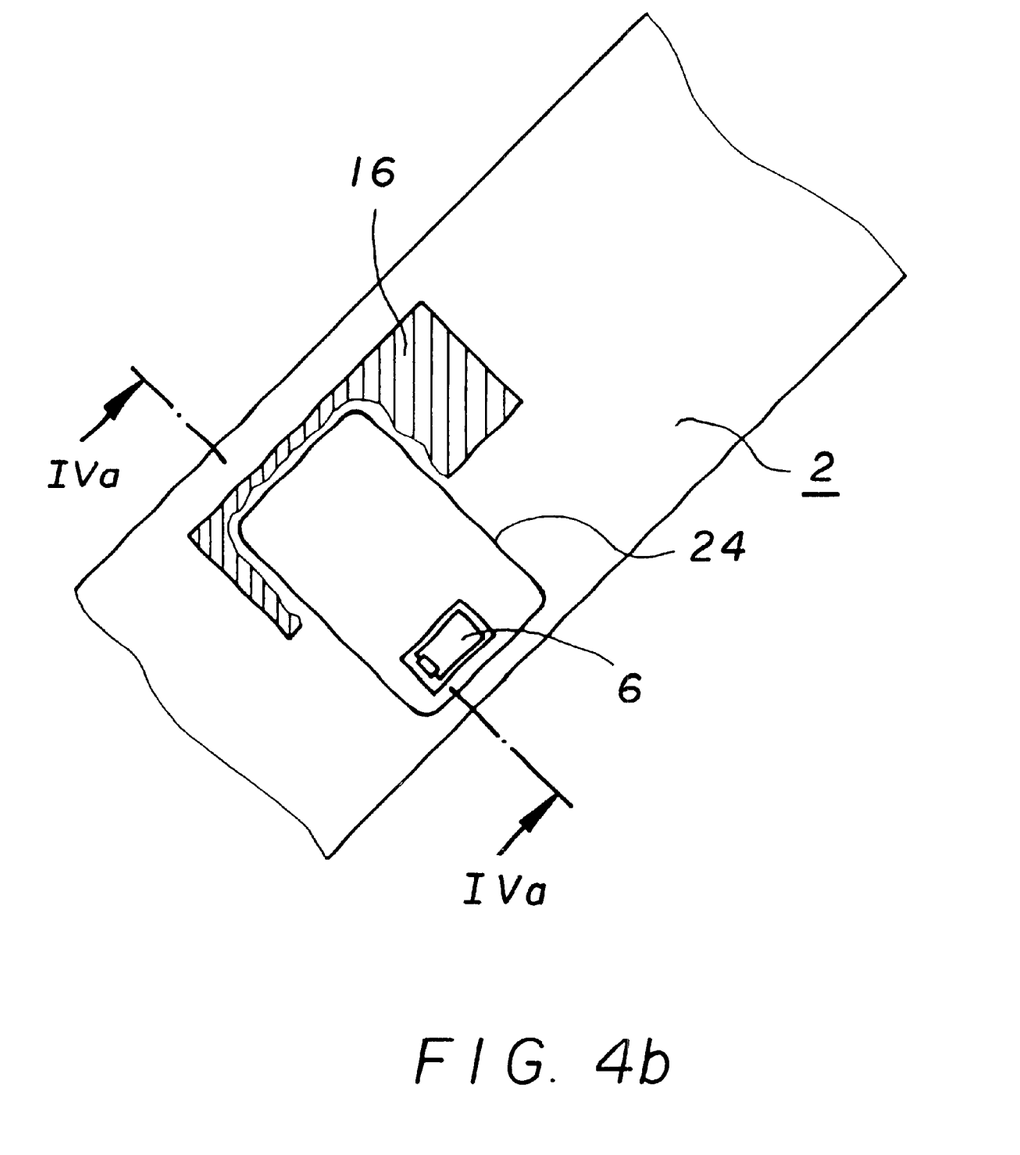
FIG. 4b is a cross section of the conveyor belt along line IVa—IVa of FIG. 4a; and, FIG. 5 is a detail longitudinal section of a system for monitoring a conveyor belt.

FIG. 4a shows a detail view, in cross section, of a system for monitoring a conveyor belt 2 via a transmitter/receiver device 4. FIG. 4b is a schematic perspective view of the system. A ferromagnetic layer 16 is embedded in the conveyor belt 2 at the spacing (a) from the surface 14 of the cover layer 8. An electrically conductive conductor loop 24 is embedded in the conveyor belt 2 below the ferromagnetic layer 16 as seen from the surface 14 of the cover layer 8. The conductor loop 24 is preferably embedded in the running layer 12 of the conveyor belt 2 because it is there protected well against mechanical loads which are present during daily use of the conveyor belt 2. The conductor loop 24 is so aligned that the area, which is enclosed thereby, is substantially parallel to the surface 14 of the cover layer 8. The conductor loop 24 is operatively connected to a transponder 6 so that a voltage, which is induced in the conductor loop by the transmitter/receiver device 4, can supply the transponder with energy. For this purpose, the transponder 6 is preferably embedded in the running layer 12 so that the area, which is enclosed by the coil of the transponder 6, lies in the area included by the conductor loop 24 as also shown in FIG. 4a.

The transmitter/receiver device 4 is mounted above the cover layer 8 so that the ferromagnetic layer 16 is located between the transmitter/receiver device 4 and the conductor loop 24. The transmitter/receiver device 4 continuously generates an electromagnetic field. The size of the ferromagnetic layer 16 is so selected that it shields the electromagnetic field, which is generated by the transmitter/receiver device 4, relative to the conductor loop 24 as long as it is undamaged. No voltage can then be induced into the conductor loop by the electromagnetic field generated by the transmitter/receiver device 4. As a consequence of the above, even the transponder 6 is not supplied with energy with an undamaged ferromagnetic layer 16 and no data can be read out therefrom.

If, in contrast, the ferromagnetic layer 16 is damaged over a large area by wear of the cover layer 8 or the ferromagnetic layer is removed from the cover layer 8, then a voltage is induced in the conductor loop 24 in the receiving region of the transmitter/receiver device 4 by the electromagnetic field generated by the device 4. The voltage, in turn, generates an electromagnetic field in the area, which is included by the conductor loop 24, and this field is utilized to supply the transponder 6 with energy. Data can then be read out of the transponder 6 by the transmitter/receiver device 4. The transmitter/receiver device 4 concludes from the reception of the data that wear is present in the cover layer 8 and initiates appropriate measures.

The transponder 6 does not have to be positioned directly in the receiving region of the transmitter/receiver device 4 when using the conductor loop 24. Rather, by the use of the conductor loop 24, the receiving area of the transmitter/receiver device 4 is increased. The conductor loop transports the electromagnetic field, which is generated by the transmitter/receiver device 4, to the transponder 6. It is therefore possible to position the transponder 6 at any desired location in the conveyor belt. Preferably, the transponder 6 is positioned at the outer edge of the conveyor belt and this is shown in FIGS. 4a and 4b. There, the transponder 6 is especially well protected against mechanical loads which can operate on the conveyor belt 2 during everyday use.

Figure 5:
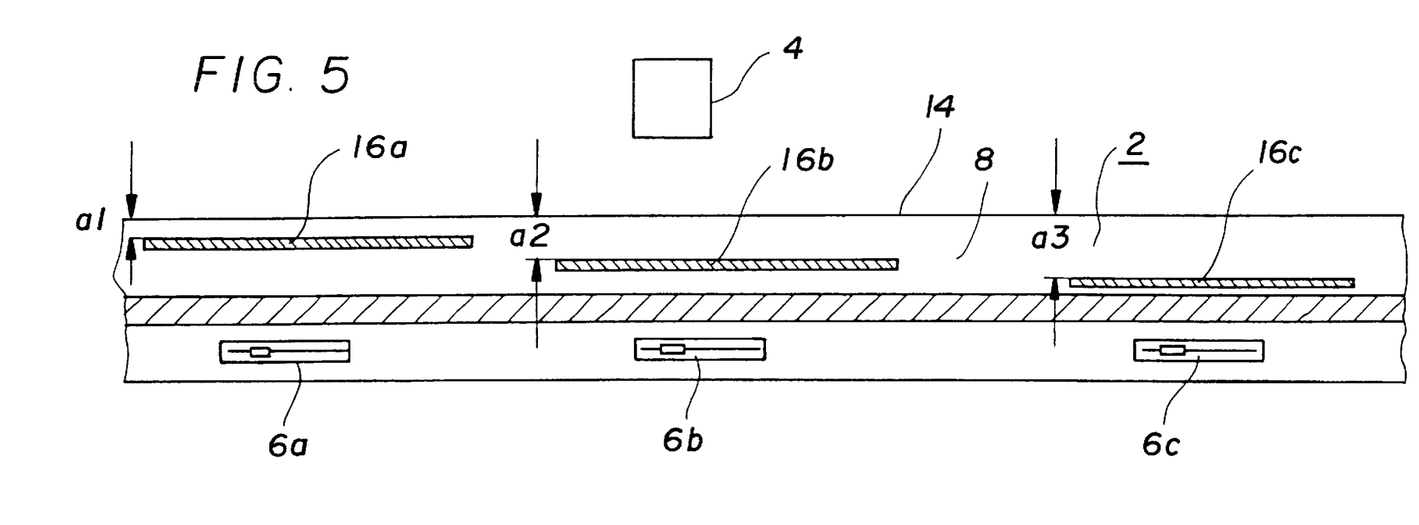

FIG. 5 is a detail view, in longitudinal section, of a portion of the system for monitoring the cover layer 8 of a conveyor belt 2. A first ferromagnetic layer 16a is mounted at a distance a1, a second ferromagnetic layer 16b is mounted at a distance a2 and a third ferromagnetic layer 16c is mounted at a distance a3 to the surface of the cover layer 8 wherein a1<a2<a3. The ferromagnetic layers 16a to 16c are so aligned as already explained with reference to FIGS. 2a and 2b. Each cover layer 16a to 16c is assigned to a corresponding one of the transponders 6a to 6c in a manner likewise already explained with respect to FIGS. 2a and 2b. A spatially fixed transmitter/receiver device 4 is mounted above the cover layer 8 outside of the conveyor belt 2 so that the ferromagnetic layer lies between the transmitter/receiver device 4 and the transponder assigned thereto.

An electromagnetic field is continuously generated by the transmitter/receiver device 4. The ferromagnetic layers 16a to 16c, however, shield the respective transponders 6a to 6c assigned thereto from this electromagnetic field when the ferromagnetic layers are not damaged or are only slightly damaged. The transmitter/receiver device 4 can only receive data from the transponders 6a to 6c when the ferromagnetic layers 16a to 16c, which are assigned thereto, are destroyed over a large area or are removed from the cover layer 8.

In the embodiment of FIG. 5, the transponders 6a to 6c preferably transmit an individual identifier to the transmitter/receiver device 4. The individual identifiers are stored in the transmitter/receiver device 4 together with the positions of the transponders 6a to 6c. If, for example, the individual identifier of transponder 6a is received, then the transmitter/receiver device 4 recognizes that the cover layer 8 is worn down to the distance a1 at the position of the transponder 6a based on a comparison with the stored identifiers. The corresponding situation applies when the transmitter/receiver device receives the individual identifier of the transponder 6b and/or of the transponder 6c. After receiving an individual identifier of one of the transponders 6a to 6c, the receiving device can initiate suitable measures. If the cover layer 8 of the conveyor belt 2 is only worn up to distance a1 or a2, then only an announcement can be outputted. If in contrast, the cover layer of the conveyor belt is worn to the distance a3, then the suitable measures can include stopping the moving conveyor belt 2.

It is understood that the foregoing description is that of the preferred embodiments of the invention and that various changes and modifications may be made thereto without departing from the spirit and scope of the invention as defined in the appended claims.

What is claimed is:

1. A system for monitoring a cover layer of a composite structure for wear with said cover layer having an outer surface and being subjected to said wear during operation of said composite structure, the system comprising:

a transponder embedded in said composite structure;

a transmitter/receiver device for continuously generating an electromagnetic field and said transmitter/receiver device being arranged spatially fixed outside of said composite structure;

said transponder being disposed in a receiving region of said transmitter/receiver device so that the transponder can be supplied with energy by said electromagnetic field and can transmit data to said transmitter/receiver device when said transponder is supplied with energy;

a ferromagnetic layer having a high permeability and being embedded in said cover layer between said transponder and said outer surface of said cover layer; and, said ferromagnetic layer being disposed to shield said transponder in said receiving region of said transmitter/receiver device so that said transmitter/receiver device receives no data from said transponder.

2. The system of claim 1, said transmitter/receiver device being so mounted relative to said cover layer that said ferromagnetic layer lies in said receiving region of said transmitter/receiver device between said transponder and said transmitter/receiver device.

3. The system of claim 1, said transmitter/receiver device being so mounted relative to said cover layer that said transponder lies in said receiving region of said transmitter/receiver device between said ferromagnetic layer and said transmitter/receiver device.

4. The system of claim 1, said ferromagnetic layer extending substantially parallel to said cover layer.

5. The system of claim 1, said ferromagnetic layer being a metal foil.

6. The system of claim 1, said ferromagnetic layer being a wire lattice.

7. The system of claim 1, said ferromagnetic layer having a thickness of 0.1 mm to 2 mm.

8. The system of claim 1, said composite structure having a plurality of layers including said cover layer; and, said transponder being disposed outside of said cover layer.

9. The system of claim 1, further comprising an electrically conducting conductor loop embedded in said composite structure beneath said ferromagnetic layer; and, said transponder being operatively connected to said conductor loop.

10. The system of claim 1, further comprising a plurality of said ferromagnetic layers embedded in said cover layer and disposed at respectively different depths in said cover layer; and, a plurality of said transponders corresponding to respective ones of said ferromagnetic layers.

11. The system of claim 10, each of said transponders having an identifier individual to it and transmitting the identifier corresponding thereto to said transmitter/receiver device when the transponder is supplied with energy by said transmitter/receiver unit.

12. The system of claim 1, wherein said composite structure is a conveyor belt.

13. A method for monitoring a cover layer of a composite structure for wear with the aid of a system and with said cover layer having an outer surface and being subjected to said wear during operation of said composite structure, the system including: a transponder embedded in said composite structure; a transmitter/receiver device for continuously generating an electromagnetic field and said transmitter/receiver device being arranged spatially fixed outside of said composite structure; said transponder being disposed in a receiving region of said transmitter/receiver device so that the transponder can be supplied with energy by said electromagnetic field and can transmit data to said transmitter/receiver device when said transponder is supplied with energy; a ferromagnetic layer having a high permeability and being embedded in said cover layer between said transponder and said outer surface of said cover layer; and, said ferromagnetic layer being disposed to shield said transponder in said receiving region of said transmitter/receiver device so that said transmitter/receiver device receives no data from said transponder, the method comprising the steps of:

continuously checking in said transmitter/receiver device as to whether said data are received; and, initiating measures via said transmitter/receiver device when said data are received.

14. The method of claim 13, wherein said composite structure is a conveyor belt.

* * * * *